US007889846B2

(12) United States Patent
Beard et al.

(10) Patent No.: US 7,889,846 B2
(45) Date of Patent: Feb. 15, 2011

(54) VOICE COORDINATION/DATA RETRIEVAL FACILITY FOR FIRST RESPONDERS

(75) Inventors: Joshua L. Beard, Washington, DC (US); Louis C. Foss, Frederick, MD (US); Nuno D. Pereira, Derwood, MD (US); Tapas K. Som, Germantown, MD (US); Robert S. Tabit, Gaithersburg, MD (US)

(73) Assignee: International Business Machines Corporation, Armonk, NY (US)

( * ) Notice: Subject to any disclaimer, the term of this patent is extended or adjusted under 35 U.S.C. 154(b) by 1555 days.

(21) Appl. No.: 11/225,667

(22) Filed: Sep. 13, 2005

(65) Prior Publication Data

US 2007/0081637 A1    Apr. 12, 2007

(51) Int. Cl.
H04M 1/64 (2006.01)
H04M 15/00 (2006.01)

(52) U.S. Cl. .................... 379/88.01; 379/133

(58) Field of Classification Search ............. 379/88.01
See application file for complete search history.

(56) References Cited

U.S. PATENT DOCUMENTS

| 4,516,125 | A  | * | 5/1985  | Schwab et al. ............. 342/36 |
| 5,557,254 | A  | * | 9/1996  | Johnson et al. ........ 340/426.19 |
| 5,689,442 | A  | * | 11/1997 | Swanson et al. ............. 380/241 |
| 5,917,405 | A  | * | 6/1999  | Joao ....................... 340/426.17 |
| 6,002,427 | A  | * | 12/1999 | Kipust ....................... 348/156 |
| 6,154,465 | A  | * | 11/2000 | Pickett ....................... 370/466 |
| 6,154,658 | A  | * | 11/2000 | Caci ........................... 455/466 |
| 6,208,658 | B1 | * | 3/2001  | Pickett ....................... 370/401 |
| 6,266,340 | B1 | * | 7/2001  | Pickett et al. ............... 370/442 |
| 6,266,341 | B1 | * | 7/2001  | Surprenant et al. .......... 370/458 |
| 6,289,025 | B1 | * | 9/2001  | Pang et al. ................... 370/458 |
| 6,298,045 | B1 | * | 10/2001 | Pang et al. ................... 370/261 |
| 6,343,074 | B1 | * | 1/2002  | Pickett ....................... 370/353 |
| 6,356,554 | B1 | * | 3/2002  | Pickett et al. ............... 370/402 |
| 6,366,578 | B1 | * | 4/2002  | Johnson ...................... 370/353 |
| 6,385,194 | B2 | * | 5/2002  | Surprenant et al. .......... 370/353 |
| 6,396,849 | B1 | * | 5/2002  | Sarkissian et al. ........... 370/490 |
| 6,400,711 | B1 | * | 6/2002  | Pounds et al. ............... 370/353 |
| 6,445,682 | B1 | * | 9/2002  | Weitz ......................... 370/257 |
| 6,498,791 | B2 | * | 12/2002 | Pickett et al. ............... 370/353 |
| 6,549,130 | B1 | * | 4/2003  | Joao ....................... 340/539.14 |

(Continued)

OTHER PUBLICATIONS

U.S. Appl. No. 11/014,313, Blossom, et al.

*Primary Examiner*—Joseph T Phan
(74) *Attorney, Agent, or Firm*—Gibb I.P. Law Firm, LLC; John Pivnichny, Esq.

(57) ABSTRACT

Disclosed is a communication server that uses a communication mediator to conduct voice/text communication sessions between users with different communications systems through a session initiation protocol (SIP) server. The communication server uses a voice recognition system to interface with participants in communications sessions and to provide a link between the participants and the mediator. The voice recognition system monitors ongoing voice communications for keywords and verbally prompts the participants to provide additional value to the communication session. The mediator can also access and retrieve information directly from a directory or from other data sources through an intelligent data server. Based on the directory information, additional participants can be added to the communication session. The mediator can also establish a connection between the data server, the voice recognition server, and the SIP server so that data requested by participants during a session may be retrieved from the data sources.

10 Claims, 2 Drawing Sheets

U.S. PATENT DOCUMENTS

| | | | |
|---|---|---|---|
| 6,570,610 B1* | 5/2003 | Kipust | 348/156 |
| 6,826,173 B1* | 11/2004 | Kung et al. | 370/352 |
| 2003/0028621 A1* | 2/2003 | Furlong et al. | 709/219 |
| 2003/0071899 A1* | 4/2003 | Joao | 348/148 |
| 2003/0227540 A1* | 12/2003 | Monroe | 348/14.02 |
| 2005/0114141 A1* | 5/2005 | Grody | 704/270 |
| 2005/0187677 A1* | 8/2005 | Walker | 701/16 |
| 2005/0282518 A1* | 12/2005 | D'Evelyn et al. | 455/404.1 |
| 2006/0026017 A1* | 2/2006 | Walker | 705/1 |
| 2007/0030841 A1* | 2/2007 | Lee et al. | 370/352 |
| 2007/0206741 A1* | 9/2007 | Tiliks et al. | 379/106.02 |
| 2009/0186597 A1* | 7/2009 | Lin et al. | 455/405 |

* cited by examiner

US 7,889,846 B2

VOICE COORDINATION/DATA RETRIEVAL FACILITY FOR FIRST RESPONDERS

BACKGROUND OF THE INVENTION

1. Field of the Invention

The invention generally relates to communication systems and, more particularly, to a communication server with a communication mediator and a voice recognition unit that may be used to engage the communication mediator.

2. Description of the Related Art

Government agencies (e.g., emergency response units, fire or accident response units, law enforcement agencies, terrorist response teams, medical response teams, etc.) often are unable to provide a coordinated response to public safety incidents due to interoperability between the communication systems (e.g., the mobile voice systems) of each responding agency and between the communication systems of each responding agency and any data systems maintained by each responding agency. Specifically, this lack of interoperability affects a responder's ability to communicate and collaborate with other responders irrespective of agency affiliation and irrespective of the type of communication system employed by the other responders. This lack of interoperability also affects a responder's ability to quickly and dynamically identify additional responders (e.g., by individual expertise or by organization) that should respond to the public safety incident and to quickly and dynamically assemble an emergency response team. Lastly, this lack of interoperability affects the ability of responders to access relevant data irrespective of what agency maintains the desired data.

U.S. patent application of Blossom et al., Ser. No. 11/014,313, filed Dec. 16, 2004 and incorporated herein by reference, discloses a communication server with a communication mediator unit that sets up communication sessions between responders operating under different, potentially non-compatible communication systems. While the idea of a communication server with a communication mediator does allow for interoperability between communication systems, there remains a need to improve the speed and efficiency with which a communication mediator can be engaged from in the field.

SUMMARY OF THE INVENTION

The invention presents a communication server that comprises a communication mediator in communication with a voice recognition system, a directory, other data sources, and a communication session initiation protocol (SIP) server. The communication mediator is adapted to access a global directory and/or other data sources (e.g., a plurality of different data sources via an intelligent data server) and to retrieve information or data stored in the directory and/or the other data sources. The communication mediator is also adapted to conduct a communication session between a plurality of responders to an incident, where the responders have different communication systems. The voice recognition system communicates with the communication mediator and is adapted to monitor communications from at least one of the responders for at least one trigger (e.g., a word or phrase) that engages the voice recognition system (VRS).

Once engaged, the VRS is adapted to interface with the responder and to provide a communications link between the responder and the communication mediator. Specifically, the VRS is adapted to request details about an incident from the responder, to review the details of the incident and, based on the details, to automatically prompt the responder to request selected information or data from the directory or other data sources. The responder can request selected information or data through the VRS by following an established request protocol such as by preceding a request with a trigger word (e.g., "Query" . . . ) or by responding affirmatively to a prompt from the VRS. Requests for information or data by the responder are transmitted from the VRS to the communication mediator. The communication mediator is adapted to access the directory and/or the data sources via the data server and to retrieve the requested information or data. For example, based on the details of the incident, the communication mediator may be adapted to access and review a list of potential responders maintained in the directory and to identify other suitable responders (i.e., either organizations or individual experts that may have an interest in or be of particular assistance with responding to the particular incident) from amongst the potential responders in the directory. Information retrieved from the directory and/or the other data sources is transmitted by the communication mediator back to the original responder via the VRS. Once directory information is retrieved by the VRS and presented to the original responder (i.e., the user), the original responder can then opt to have those identified suitable responders added to the incident and included as participants in any communication sessions. Alternatively, the communication mediator can be adapted to automatically engage the identified suitable responders in the incident, based upon information that may have been gathered about the incident from the VRS, and to include such responders as participants in any communication sessions without the system prompting original responder.

Additionally, the communication server can comprise a communication session initiation protocol server connected to the communication mediator and adapted to initiate the communication sessions between the responders. For example, the VRS can be adapted to receive communication session initiation requests and to communicate the initiation requests to the communication mediator. The communication mediator can be adapted to conduct the communication session through the communication SIP server. The communication SIP server can also be connected to the data server, and thus, connected to the plurality of different data sources. This configuration allows the communication mediator to coordinate data retrieval from the different data sources in response to requests from session participants during communication sessions. The data server further can comprise a voice/data/text converter adapted to convert voice messages into data/text messages and data/text messages into voice messages such that responders, having voice communication systems, may verbally request and receive data through the data server during the communication session.

An embodiment of the computer implemented method of providing communications between different communication systems comprises monitoring communications from one or more communication systems and, particularly, from at least one responder to an incident for at least one trigger (e.g., a word or phrase). Upon detecting a trigger, a voice recognition system (VRS) is engaged to interface with the responder about the incident and to provide a communication link between the responder and a communication mediator. The communication mediator provides the responder with access to a directory (e.g., a global directory of all potential responders including communication system addresses) and/or to other data sources (e.g., a plurality of different data sources via a data server) and allows the responder to participate in a communication session with other responders, having different communication systems.

The VRS interfaces with a responder by requesting details about the incident. Based on the details provided, the VRS automatically prompts the responder to request selected data from the directory and/or the other data sources. If selected data is requested, the VRS will pass the request to the communication mediator. The communication mediator will access either the directory or the other data sources and retrieve the requested data. The communication mediator will then pass the data back to the responder via the VRS. For example, a responder can request a list of other suitable responders (e.g., a list of organizations and/or individuals that have either an interest in the incident and/or an expertise that may be of assistance in responding to the incident), which may be targeted for participation in a communication session. The communication mediator then accesses a directory of potential responders, including a communication system address for each of the potential responders and, based on the details provided by the responder, develops the list. Once directory information is retrieved by the VRS and presented to the original responder, the original responder can then opt to have those identified suitable responders added to the incident and included as participants in any communication sessions. Alternatively, depending on information that may have been gathered about the incident from the VRS, the identified suitable responders may become engaged in the incident automatically and included as participants in any communication sessions without the system prompting the original responder. Similarly, a responder can request data relevant to a particular incident (e.g., the identity of a vehicle owner from a license plate number, a criminal record of an individual involved in the incident, etc.). The communication mediator can retrieve this data from a database of records maintained at a department of motor vehicles (i.e., a data source) via a data server and then transmit the data to the responder via the VRS.

Additionally, the responder can request via the VRS that a communication session be initiated through a communication session initiation server (e.g., an SIP server) and conducted by the communication mediator. The responders participating in the communication session can be the original responders. Additionally, as mentioned above, other suitable responders identified by the communication mediator from amongst a list of potential responders in the directory can also be engaged and participate, depending upon the embodiment, either upon request or automatically based upon the details acquired by the VRS about the incident. The session participants can be provided with access to a plurality of data sources during the communication session. For example, a communications link can be established between the communication mediator, the SIP server and the data server, which is in communication with the plurality of different data sources. This communication link allows the communication mediator to coordinate data retrieval from the different data sources in response to requests from session participants. Additionally, voice messages from the session participants can be translated to data/text messages in order to retrieve the data from the data sources. Once retrieved, the data/text messages from the data sources can be translated to voice messages. Thus, session participants can verbally request and receive data from the data sources.

These and other aspects of embodiments of the invention will be better appreciated and understood when considered in conjunction with the following description and the accompanying drawings. It should be understood, however, that the following description, while indicating preferred embodiments of the invention and numerous specific details thereof, is given by way of illustration and not of limitation. Many changes and modifications may be made within the scope of the embodiments of the invention without departing from the spirit thereof, and the invention includes all such modifications.

BRIEF DESCRIPTION OF THE DRAWINGS

The embodiments of the invention will be better understood from the following detailed description with reference to the drawings, in which.

DETAILED DESCRIPTION OF PREFERRED EMBODIMENTS OF THE INVENTION

Figure 1:
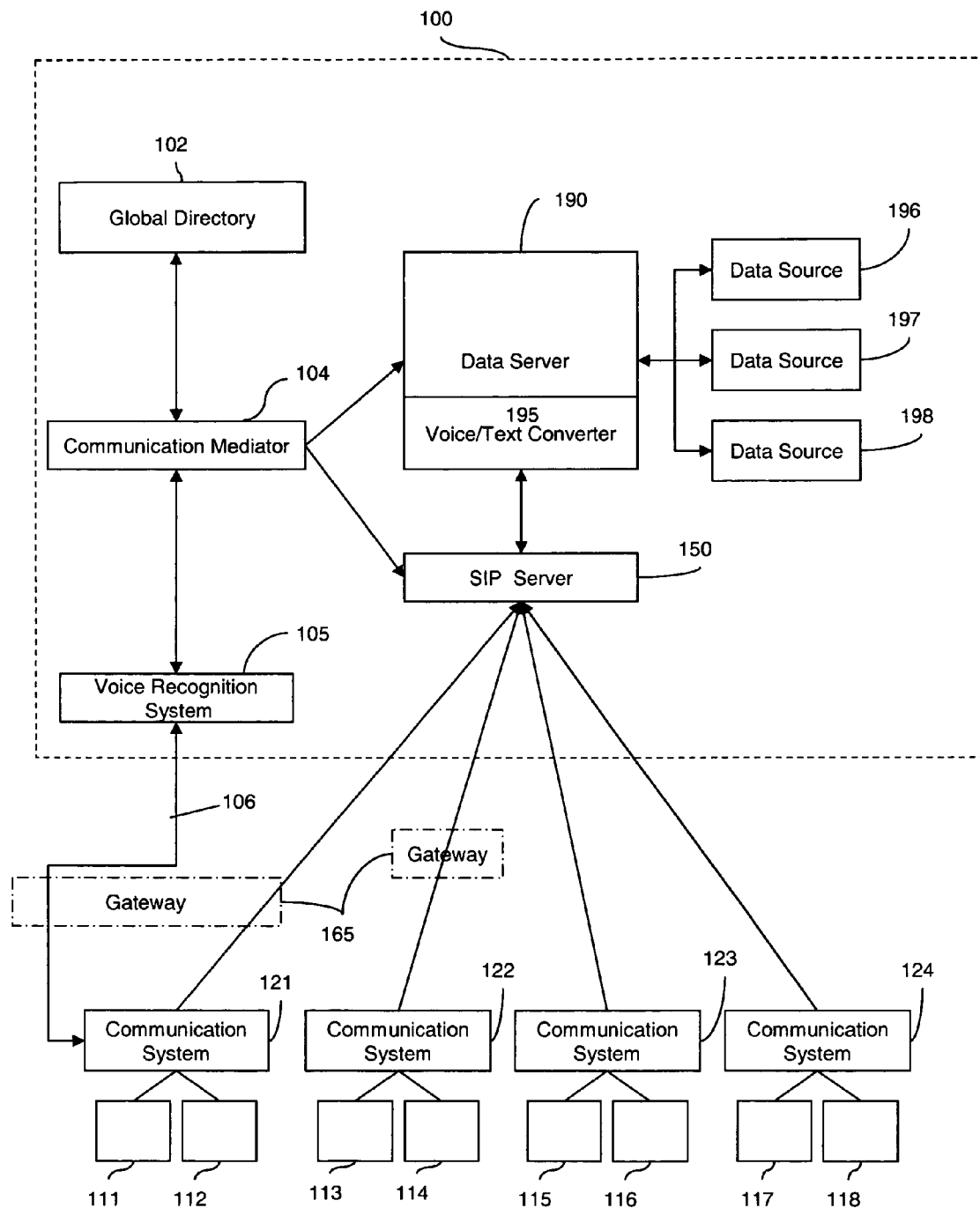
FIG. 1 illustrates a schematic diagram of an embodiment of the system of the invention.

The embodiments of the invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the embodiments of the invention. The examples used herein are intended merely to facilitate an understanding of ways in which the embodiments of the invention may be practiced and to further enable those of skill in the art to practice the embodiments of the invention. Accordingly, the examples should not be construed as limiting the scope of the invention.

As mentioned above, U.S. patent application of Blossom et al., Ser. No. 11/014,313, filed Dec. 16, 2004, incorporated herein by reference, and hereinafter referred to as Blossom, discloses a communication server with a communication mediator unit that sets up communication sessions between responders operating under different, potentially non-compatible communication systems. While the idea of a communication server with a communication mediator does allow for interoperability between communication systems, there remains a need to improve the speed and efficiency with which a communication mediator can be engaged from in the field.

Disclosed herein is a similar communication server with a communication mediator (e.g., a software-based mediator unit) that is adapted to conduct communication sessions between users with different communications systems; however, the communication server further incorporates the use of voice recognition technology that allows a user to interface with the voice recognition system (VRS) in order to provide a link between the user and the communication mediator. Furthermore, the communication mediator, upon request of the responder via the VRS, can access and retrieve information or data from a directory or other data sources (e.g., via an intelligent data server) and pass the information or data to the user through the VRS. For example, the communication mediator 104 can access different data sources to provide data records (e.g., driving records, motor vehicle records, criminal records, terrorist watch lists, a "No-Fly" list, etc.) to the user. Alternatively, the directory may be used to identify target responders or participants for a communication session (e.g., skilled resources or representatives of an organization having an interest in the communication session). Then, using the communication mediator and an SIP server, a voice/text collaboration session amongst the target participants can be initiated and conducted at the request of the user, irrespective of the communication systems of the target participants. Additionally, the communication mediator can establish a connection between the data server for a plurality of different data sources and the SIP server, such that the data sources are available for data retrieval by the participants during the communication session. The data server can further comprise a voice/text converter (e.g., an SIP enabled voice-to-text/text-to-voice module) that allows voice participants in the communication session to verbally request and receive data from the different data sources during the communication session.

More particularly, referring to FIG. 1, disclosed is a communication server 100 that comprises a communication mediator 104 in communication with a VRS 105, with a global directory 102, with a communication session initiation protocol (SIP) server 150 and with a data server 190 connected to a plurality of different data sources 196-198. The SIP server 150 is also in communication with the data server 190 and thus, the plurality of different data sources 196-198. The communication mediator 104 (e.g., a software-based mediator unit) is adapted to access and retrieve information stored in the directory 102 and/or data stored in the data sources 196-198 (via the data server 190). Additionally, the communication mediator 104 is adapted to conduct a communication session (i.e., a voice/text communication session) between a plurality of users 111-118 where the participants have different communication systems 121-124 (e.g., public switched telephone networks, a wireless telephone networks, a cellular telephone networks, a text messaging systems, two-way radios, a broadcast radios, an e-mail systems, land mobile radio networks, and any other addressable network). The data interoperability functions and voice interoperability functions between the different communication systems 121-124 during a communication session are controlled by the mediator 104, e.g., as described in Blossom. For illustration purposes, the users 111-118 of the method and system of the invention are described herein with reference to responders to incidents involving public safety (e.g., police officers, emergency personnel, etc.). However, those skilled in the art will recognize that the method and system of the invention may be used to conduct verbal communication sessions between participants with different communication systems regardless of the purpose or the user.

The voice recognition system (VRS) 105 communicates with the communication mediator 104 and is adapted to monitor voice communications from one or more users (e.g., responders 111-118 to an incident) of one or more communication systems 121-124 for a trigger (e.g., a special word or phrase) that engages the VRS 105. For example, the VRS 105 can monitor the radio or voice transmissions of one or all of the users of an existing voice communication system 121 (e.g., a Land Mobile Radio (LMR) point to point or trunk network, a Cellular Phone network, voice conferencing network, etc.). Specifically, the VRS 105 can monitor the transmissions made over the communication system 121 by a single responder 111 or multiple responders 111-112. Once the special word or phrase is detected and the VRS 105 is engaged, the VRS 105 is adapted to interface with the user or users and to provide a communications link 106 between the user or users and the communication mediator 104. For example, the responder 111 can verbally request through the VRS 105 that the communication mediator 104 engage another participant (e.g., responder 114) that uses a different communication system (e.g., system 122) and include that responder 114 in any communication sessions.

Additionally, the VRS 105 can be adapted to request information (e.g., information about an incident) from one or more of the users (e.g., the responder 111), to review the information and, based on the information, to automatically prompt the user to request selected information or data from the directory 102 or the data sources 196-198. For example, the directory 102 may comprise a listing of all potential responders to different types of incidents and can include corresponding communication system addresses. The potential responders being either organizations or individuals that have either an interest in responding to different types of incidents or a particular expertise that may be of assistance in responding to different types of incidents. The VRS 105 can be adapted to request details about an incident from a responder 111, to review those details provided by the responder 111, and, based on the details provided, ask the responder 111 if an address for a communication system of a given organization or type of expert is desired. Alternatively, the plurality of different data sources 196-198 can comprise one or more different types of records that may be relevant to an original responder's response to an incident. For example, the data sources 196-198 may include driving records, motor vehicle records, criminal records, terrorist watch lists, a "No-Fly" list, or other information relevant to the investigation of a public safety incident (e.g., investigation check-lists, hazardous materials lists, etc.). The VRS 105 can be adapted to review the details of the incident provided by the responder 111 and, based on these details, ask the responder 111 if selected data is desired (e.g., a vehicle registration check of a license plate number, a criminal background check of an individual involved in the incident, etc.) from the one or more data sources 196-198. Such pre-programmed prompting of the responder 111 by the VRS can assist the responder in properly responding to an incident.

The user can request selected data through the VRS 105 by following an established request protocol such as by preceding a request with a trigger word (e.g., "Query" . . . ) or by responding affirmatively to a prompt from the VRS 105. Requests for information by the user with or without prompting by the VRS are transmitted from the VRS 105 to the communication mediator 104. The communication mediator 104 is adapted to access the global directory 102 and/or the data sources 196-198 (e.g., via the data server 190) to retrieve requested information. For example, based on the details of an incident provided by a responder 111, the communication mediator 104 may be adapted to access and review a directory 102 of potential responders and to identify and develop a list of other suitable responders from amongst the potential responders in the directory 102, including a corresponding communication system address (e.g., a trunk number for a land mobile radio, a group number, a telephone number, etc.). In other words, at the request of a responder 111, a mediator 104 can access the directory 102 to develop a target communication session participants list comprising either organizations or individual experts that may have an interest in or be of particular assistance during a communication session regarding a particular incident. Information retrieved from the directory 102 by the communication mediator 104 is then transmitted back to the user-responder 111 via the VRS 105. Once directory 102 information is retrieved by the VRS 105 (via the communication mediator 104) and presented to the original responder 111, the original responder 111 can then opt to have those identified suitable responders added to the incident and included as participants in any communication sessions. Alternatively, the communication mediator 104 can be adapted to automatically engage the identified suitable responders in the incident, based upon information that may have been gathered about the incident from the VRS 105, and to include such responders as participants in any communication sessions without the system prompting original responder.

Additionally, as mentioned above, the communication server 100 can comprise a communication session initiation protocol server 150 connected to the communication mediator 104. The communication session initiation protocol server 150 can be adapted to initiate the voice/text communication session between users such as first responders to an incident or other suitable responders to an incident as identified by the communications mediator (e.g., users 111-118). For example, the communication session initiation server 150 can comprise a session initiation protocol (SIP) server that is capable of connecting together one or more users 111-118, having one or more different communication systems 121-124. This enables a very thin client, such as a web browser, to request that the server create a call from a simple html page. Any communication device that is addressable may be connected to the communication session initiation protocol server 150 regardless of underlying technology; however, gateways 165 may be required to adapt some devices (e.g., such as LMRs) so that they can participate in the voice communication sessions managed by the SIP server 150. Any number of participants can be connected to any number of conferences associated with a particular incident or incidents by using a standard SIP server.

More specifically, the VRS 105 can be adapted to receive communication session initiation requests (i.e., a request from a responder to initiate a voice/text communication session) and to communicate the initiation request to the communication mediator 104. The communication mediator 104 can be adapted to conduct the communication session through the communication SIP server 150. Specifically, communication session participants that are either requested by user 111 or identified from the directory and automatically engaged by the mediator 104 are connected together by the mediator 104 through the communication SIP server 150. The connection between each participant (e.g., users 111-118) and the server 150 can be made through each user's computer, landline phone, cell phone, radio, or instant messaging client (after transcribing the voice to text). However, as mentioned above, those skilled in the art will recognize that internet protocol gateways 165 must be established to provide communication between a user of a land mobile radio (LMR) network and both the communication mediator 104 and the VRS 105. Also, as mentioned above, data interoperability functions and voice interoperability functions between the different communication systems 121-124 during a communication session are controlled by the mediator 104, e.g., as described in Blossom.

The data server 190 can comprise an intelligent data server that is connected to the plurality of different data sources 196-198. The data server 190 can be in communication with the communication mediator 104, as discussed above, and also in communication with the communication session initiation protocol server 150. The mediator 104 can be adapted to coordinate the communication sessions between the users (i.e., the participants). The mediator 104 can further be adapted to coordinate data retrieval from the different data sources in response to requests from session participants. Specifically, the mediator 104 can be adapted to communicate with both the SIP server 150 and the data server 190 to initiate requests for data from the users based on the recognized text information from voice recognition server 105. Furthermore, the data server 190 can comprise a voice/data/text converter 195 adapted to convert voice messages into data/text messages and data/text messages into voice messages such that users 111-118, having voice communication systems, may communicate with the data server during the communication session. In other words, the data server 190 can be front ended by an SIP enabled voice-to-text module that allows participants in a voice/text communication session to verbally request and receive data from the data sources 196-198.

Figure 2:
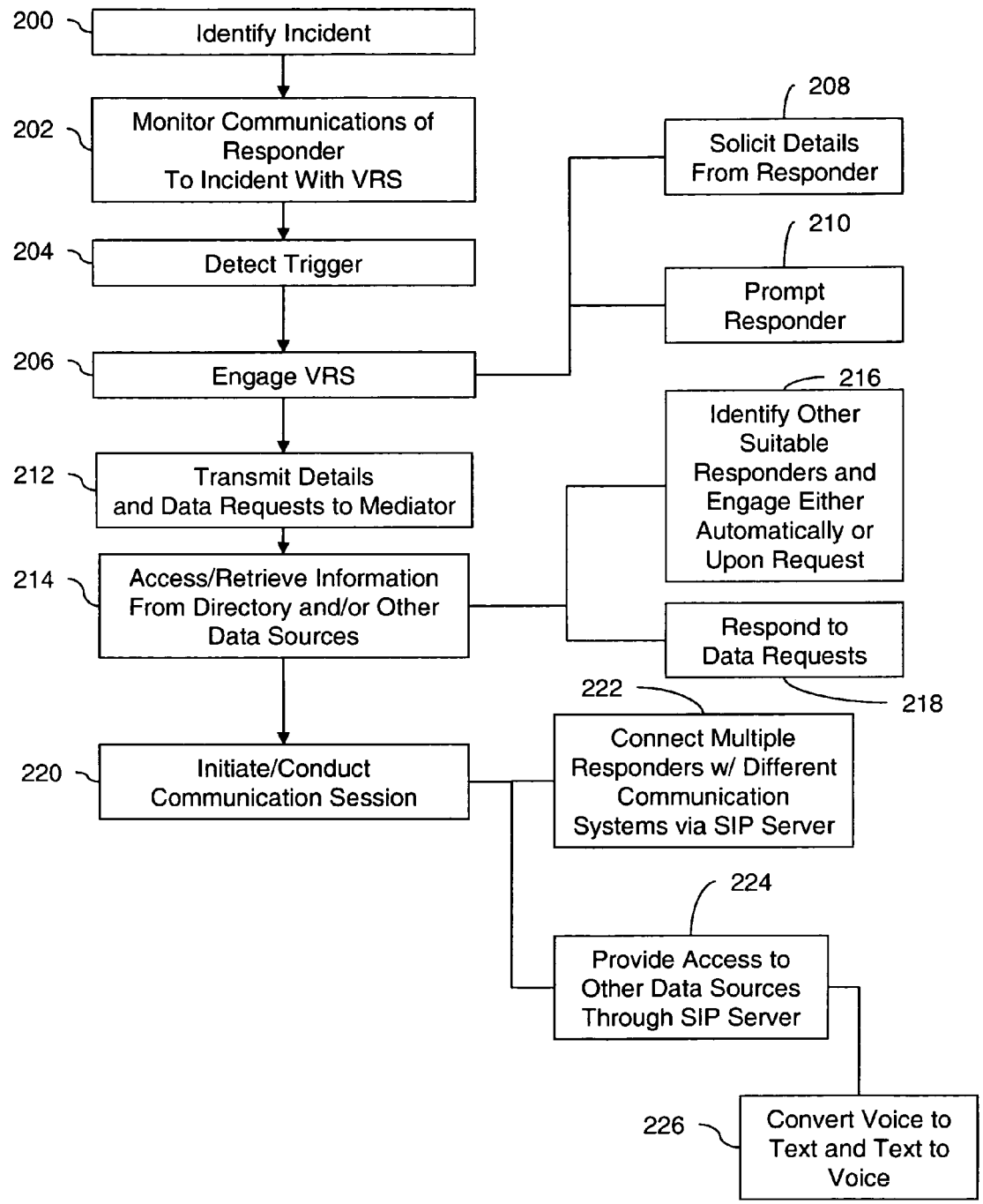
FIG. 2 is a flow diagram illustrating an embodiment of the method of the invention.

Referring to FIGS. 1 and 2 in combination, an embodiment of the method of providing communications between different communication systems 121-124 can comprise identifying an incident (see item 200) such as an incident that affects public safety (e.g., a fire, a hazmat spill, a crime, an vehicle accident, a terrorist attack, etc.) and using a voice recognition system (VRS) 105 to monitor (see item 202) communications from at least one communication system (e.g., system 121) and, particularly, at least one responder 111 to the incident for at least one trigger (e.g., a word or phrase). The method is described herein with the VRS 105 monitoring the communications of at least responder to an incident on at least one communication system. However, such limitations are offered for illustration purposes only. Those skilled in the art will recognize that the method may be practiced by monitoring and interfacing with multiple different users, not simply a single responder to an incident, regardless of the purpose of the communication. Upon detecting the trigger (see item 204), the voice recognition system (VRS) 105 is engaged (see item 206) to interface with the responder 111 about the incident and to provide a communication link between the responder 111 and a communication mediator 104. The communication mediator 104 (e.g., a software-based mediator) provides the responder 111 with access to first responder directory information stored in a global directory 102 and/or access to other data sources 196-198 (e.g., via a data server 190). Additionally, the communication mediator 104 in conjunction with a communication session initiation protocol server 150 allows the responder 111 to participate in a communication session between a plurality of responders 111-118, having different communication systems.

The VRS 105 interfaces with the responder 111 in a variety of manners. For example, the responder 111 can verbally request through the VRS 105 that the communication mediator 104 engage another responder 114 having a different communication system 122 and to include that other responder 114 in any communication sessions. Additionally, the VRS 105 can interface with the responder 111 by requesting details about the incident (see item 208). Based on the details provided (see item 208), the VRS 105 can automatically prompt (see item 210) the responder 111 to request selected data from the directory and/or other data sources. If selected data is requested, the VRS 105 will pass (see item 212) the request to the communication mediator 104. The communication mediator 104 will access the directory 102 and/or the other data sources 196-198 (e.g., via the data server 190) and retrieve the requested data (see item 214). The communication mediator 104 can then pass the requested data back to the responder via the VRS or can use the data in conjunction with initiating a communication session (see item 220 described below). For example, a responder 111 can request a list of other suitable responders that may be considered target participants for a communication session regarding a particular incident. The list can include organizations and/or individuals that have either an interest in the incident and/or an expertise that may be of assistance in responding to the incident. Once such a list is requested by the responder 111, the communication mediator 104 can access the data storage device 101. Particularly, the mediator 104 can access the directory 102 of potential responders and identify (see item 216) any other suitable responders from amongst the organizations and individuals listed in the directory 102 using the details provided by the responder at process 208 as context. Once directory information is retrieved by the VRS 105 and presented to the original responder (i.e., the user), the original responder can then opt to have those identified suitable responders added to the incident and included in any communication sessions. Alternatively, depending on information that may have been gathered about the incident from the VRS, the identified suitable responders may be engaged in the incident automatically and included in any communication sessions without the system prompting original the responder. Similarly, the responder 111 can request specific data related to an incident (e.g., a registered owner of a vehicle based on a license plate number, a criminal history of an individual involved in an incident, etc.). Once such data is requested, the communication mediator 104 can accesses via the data server 190 the data sources 196-198 containing the requested information and respond to the request (see item 218).

The responder 111 can further request via the VRS 105 that a communication session be initiated through a communication session initiation protocol server 150 (e.g., an SIP server) and conducted by the communication mediator 104 (see item 220). The communication session is conducted by connecting the different communication systems 121-124 of the multiple participants (e.g., initial and other suitable responders 111-118) together via an SIP Server 150 (see item 222). The responders 111 participating in the communication session can be provided with access to the plurality of data sources 196-198 during the communication session through the communication session initiation server (see item 224). The mediator 104 can coordinate communication during a communication session between users and the data sources. Specifically, the mediator 104 communicates with both the SIP server 150 and the data server 190 to initiate requests for data from users based on the recognized text information from VRS 105. Voice messages from the responders participating in the communication session can be translated (e.g., by a converter 195) to data/text messages in order to retrieve the data from the data sources and, once retrieved, the data/text messages from the data sources can be translated to voice messages (see item 226). Thus, responders participating in the communication session can verbally request and receive data from the data sources.

Therefore, disclosed is a communication server with a communication mediator that is adapted to conduct voice/text communication sessions between users with different communication systems through a communication session initiation protocol server. The communication server further incorporates the use of a voice recognition system to interface with a user and to provide a link between the user and the communication mediator. The communication mediator can access and retrieve information from a directory list or other data source and pass the information to the user via the VRS. Additionally, the communication mediator can establish a connection between an intelligent data server for a plurality of different data sources and the communication session initiation protocol server such that the data sources are available to users during a communication session. The data server can further comprise a voice/text converter that allows users with voice communication systems to verbally request and receive data from the different data sources during the communication session.

The exemplary embodiments of the system and method described above are exemplary in nature and so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the invention has been described in terms of embodiments, those skilled in the art will recognize that the invention can be practiced with modification within the spirit and scope of the appended claims.

What is claimed is:

1. A communication server comprising:
   a directory comprising stored information;
   a plurality of data sources comprising stored data;
   a communication mediator adapted to conduct a communication session between a plurality of users having different communication systems and to access and retrieve information from said directory; and
   a voice recognition system in communication with said communication mediator and adapted to monitor communications from at least one user for at least one trigger that engages said voice recognition system, wherein once engaged said voice recognition system is adapted to interface with said at least one user and to provide a communications link between said at least one user and said communication mediator;
   a session initiation protocol (SIP) server adapted to initiate said communication session between said plurality of users, wherein said voice recognition system is adapted to receive an initiation request from said at least one user to initiate said communication session and to communicate said initiation request to said communication mediator and wherein said communication mediator is adapted to conduct said communication session through said SIP server; and,
   a data server in communication with said plurality of data sources, said communication mediator and said SIP server, wherein said communication mediator is adapted to coordinate communication between said users and said plurality of data sources through said data server, and wherein said data server further comprises a voice/data/text converter adapted to convert voice messages into data/text messages and data/text messages into voice messages such that a voice participant in said communication session may communicate with said data server.

2. The communication server of claim 1, wherein said voice recognition system is further adapted to transmit a request, from said user, for any of specific information and specific data contained in any of said directory and said data sources to said communication mediator and to further transmit said any of said specific information and said specific data, as retrieved from said any of said directory and said data sources by said communication mediator, back to said user.

3. The communication server of claim 1, wherein said plurality of users comprises at least one responder to an incident, and wherein said voice recognition system is further adapted to request details about said incident from said at least one responder, to review said details and, based on said review of said details, to automatically prompt said at least one responder to request any of specific information and specific data from any of said directory and said data sources.

4. The communication server of claim 3,
   wherein said communication directory comprises a directory of potential responders, including a corresponding communication system address for each of said potential responders,
   wherein said directory is organized by at least one of individual expertise and organization interests, and wherein said specific information comprises a list, automatically complied from said directory, of suitable responders to said incident, including corresponding communication system addresses for said suitable responders, said suitable responders comprising any of organizations and individuals that have at least one of an interest in said incident and an expertise that may be of assistance in responding to said incident.

5. The communication server of claim 3, wherein said specific data comprises data records automatically complied from said data sources and associated with any of specific individuals involved in said incident and specific property involved in said incident.

6. A computer-implemented method of providing communication between different communication systems, said method comprising:

monitoring, by communications from a communication system of at least one user of a plurality of users, having a plurality of users having different communications systems, for at least one trigger;

upon detecting said at least one trigger, engaging a voice recognition system to interface with said at least one user and to provide a communication link between said at least one user and a communication mediator, wherein said communication mediator provides said at least one user with access to information stored in a directory and allows said at least one user to participate in a communication session with said plurality of users; and during said communication session, providing said plurality of users with access to data stored in a plurality of data sources, wherein said providing comprises:

establishing communication between a session initiation protocol (SIP) server, said communication mediator and a data server, wherein said data server is in communication with said plurality of data sources;

coordinating communication between said plurality of users and said plurality of data sources through said data server using said communication mediator; and translating voice messages to data/text messages and translating data/text messages to voice messages such that said plurality of users can verbally request and receive data during said communication session.

7. The method of claim 6, wherein said at least one user comprises a responder to an incident and wherein interfacing with said at least one user comprises:

requesting from said at least one responder details about said incident;

reviewing said details;

based on said reviewing of said details, automatically prompting said at least one responder to request any of specific information and specific data from any of said directory and said data sources; and in response to such a request for said any of said specific information and said specific data, providing said any of said specific information and said specific data to said at least one responder.

8. The method of claim 6, wherein said at least one user comprises a responder to an incident, wherein said directory comprises a directory of potential responders, including a communication system address for each of said potential responders, wherein interfacing with said at least one user further comprises, based on said details, automatically identifying and communicating to said responder at least one other suitable responder to said incident from amongst said potential responders in said directory, and wherein said at least one other suitable responder comprises one of an organization and an individual that has at least one of an interest in said incident and an expertise that may be of assistance in responding to said incident.

9. The method of claim 6, further comprising responding to an initiation request from said at least one user to initiate said communication session.

10. The method of claim 9, wherein said responding to said initiation request comprises:

initiating said communication session through a session initiation protocol (SIP) server; and conducting said communication session.

\* \* \* \* \*